US012561741B2

(12) United States Patent
Acero et al.

(10) Patent No.: US 12,561,741 B2
(45) Date of Patent: Feb. 24, 2026

(54) METHOD AND SYSTEM FOR DYNAMIC REQUEST FOR QUOTATION PRICING USING PROPORTIONAL-INTEGRAL-DERIVATIVE CONTROL WITH BAYESIAN OPTIMIZATION

(71) Applicant: JPMorgan Chase Bank, N.A., New York, NY (US)

(72) Inventors: Fernando Acero, London (GB); Parisa Zehtabi, London (GB); Levon Haykazyan, London (GB); Alice Guichenez, London (GB); Karim Khiar, New Canaan, CT (US); Daniele Magazzeni, London (GB); Michael Cashmore, Falkirk (GB); Manuela Veloso, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 23 days.

(21) Appl. No.: 18/430,000

(22) Filed: Feb. 1, 2024

(65) Prior Publication Data

US 2025/0252491 A1 Aug. 7, 2025

(51) Int. Cl.
*G06Q 40/04* (2012.01)
(52) U.S. Cl.
CPC .................................. *G06Q 40/04* (2013.01)

(58) Field of Classification Search
CPC ....................................................... G06Q 40/04
USPC ....................................................... 705/35–45
See application file for complete search history.

(56) References Cited

U.S. PATENT DOCUMENTS

| | | | |
|---|---|---|---|
| 8,473,400 B1 * | 6/2013 | May ...................... | G06Q 40/00 705/37 |
| 2007/0118462 A1 * | 5/2007 | Brady ................... | G06Q 40/04 705/37 |
| 2025/0060997 A1 * | 2/2025 | Ipsen ................... | G06F 9/5005 |

* cited by examiner

*Primary Examiner* — Robert R Niquette
(74) *Attorney, Agent, or Firm* — Greenblum & Bernstein, P.L.C.

(57) ABSTRACT

A method and a system for dynamic request for quotation (RFQ) pricing using proportional-integral-derivative (PID) control with Bayesian optimization in order to determine an optimal linear state-feedback controller for tracking a metric are provided. The method includes: receiving bid price information and ask price information that relates to a financial instrument; selecting a metric to be used in conjunction with a determination of an RFQ price with respect to the financial instrument; estimating an output of a PID controller based on a predetermined function of the metric; adjusting the estimate by using a Bayesian optimization process; and using the PID controller, the adjusted estimate, the bid price information, and the ask price information to determine the RFQ price.

16 Claims, 5 Drawing Sheets

400

Receive Bid Price and Ask Price Information re Financial Instrument
S402

Select Metric re Request For Quotation (RFQ) Pricing
S404

Estimate Output of Proportional-Integral-Derivative (PID) Controller Based on Function of Metric
S406

Adjust Estimate by Performing Bayesian Optimization Process
S408

Determine RFQ Price by Using PID Controller, Adjusted Estimate, Bid Price Information, and Ask Price Information
S410

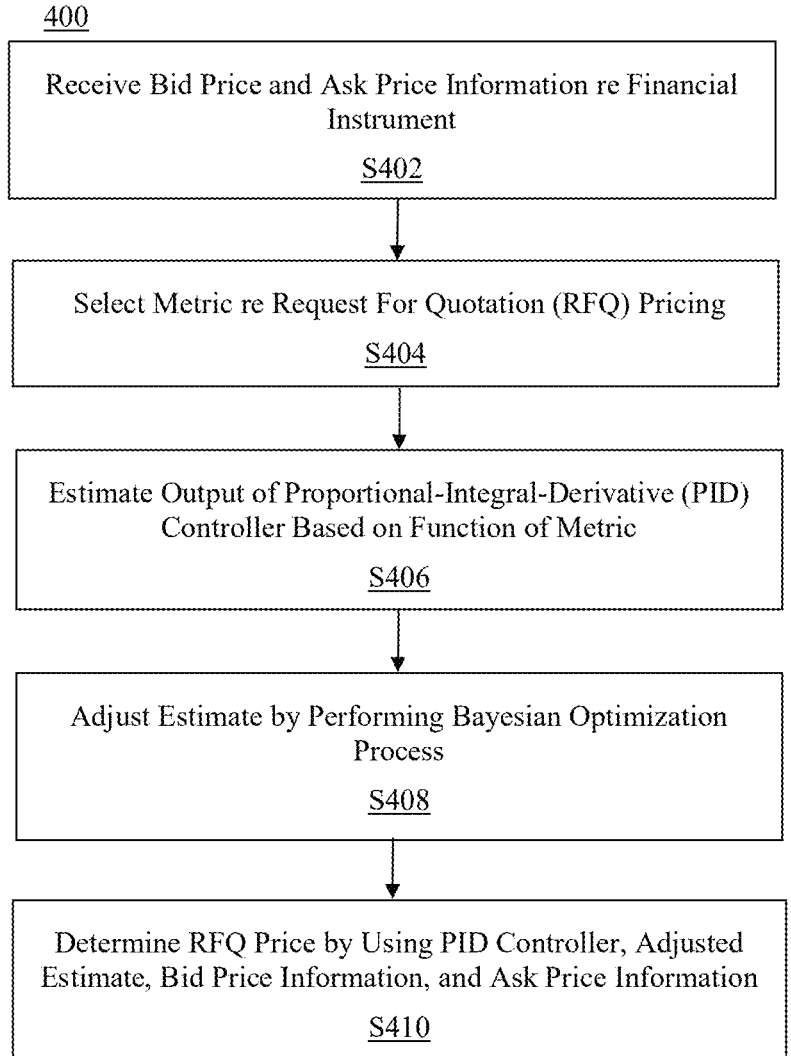

400

Receive Bid Price and Ask Price Information re Financial Instrument

S402

Select Metric re Request For Quotation (RFQ) Pricing

S404

Estimate Output of Proportional-Integral-Derivative (PID) Controller Based on Function of Metric

S406

Adjust Estimate by Performing Bayesian Optimization Process

S408

Determine RFQ Price by Using PID Controller, Adjusted Estimate, Bid Price Information, and Ask Price Information

METHOD AND SYSTEM FOR DYNAMIC REQUEST FOR QUOTATION PRICING USING PROPORTIONAL-INTEGRAL-DERIVATIVE CONTROL WITH BAYESIAN OPTIMIZATION

CROSS-REFERENCE TO RELATED APPLICATIONS

This application is being filed concurrently on Feb. 1, 2024 with U.S. patent application Ser. No. 18/430,037, entitled "Method and System for Dynamic Request for Quotation Pricing Using Reinforcement Learning and Symbolic Regression"; the contents of which are hereby incorporated by reference in its entirety.

BACKGROUND

1. Field of the Disclosure

This technology generally relates to a method for dynamic request for quotation pricing, and more particularly to a method and a system for dynamic request for quotation pricing using proportional-integral-derivative control with Bayesian optimization in order to determine an optimal linear state-feedback controller for tracking a metric.

2. Background Information

In the context of financial markets, Requests for Quotation (RFQs) are the business process through which a market-making entity provides prospective clients with the price for a tradable asset. There are various aspects that may be considered when determining RFQ pricing, such as desired expected profit for the trade, cost of capital or execution, risk factors related to the instrument the RFQ relates to, desired market share against market-making competitors, amongst others.

From a technical standpoint, RFQ pricing can be formulated as a problem of dynamically adjusting a pricing strategy to minimize the tracking error with respect to the target value for a given metric. Such a metric can be related to the hit ratio, which may be understood as referring to how often RFQs are covered, i.e., the price provided is the best price amongst competitors and the trade is executed; profit for the market-maker; desired market share amongst competitors; desired risk levels; and/or any other suitable metric. In general, these metrics are computed as a rolling average through time, and there may be target values for such metrics. Such targets may be the output of a human decision-making process or an automated optimization process, but this analysis is not concerned with the nature of the origin of the target, and simply assumes that a target value is given for a metric and that the target value may change through time. The fundamental problem thus is: how should RFQs be priced to minimize the tracking error with respect to the target metric at any given time?

The above problem can be tackled from the perspective of control theory, where the role of the controller is to price RFQs to satisfy the objective of minimizing tracking error with respect to the target metric at any given time. The pricing problem can be decomposed into two problems-a prediction problem and a control problem. The prediction problem concerns predicting what the effect of a given price will be, which to some extent depends on how other competitors in the market will behave, whereas the control problem relates to determining the price that will optimize the objective of tracking a metric. Combining a prediction model and a controller, RFQ prices can be generated.

Accordingly, there is a need for a method for dynamic request for quotation pricing using a control mechanism in order to determine an optimal linear state-feedback controller for tracking a metric.

SUMMARY

The present disclosure, through one or more of its various aspects, embodiments, and/or specific features or sub-components, provides, inter alia, various systems, servers, devices, methods, media, programs, and platforms for dynamic request for quotation (RFQ) pricing using proportional-integral-derivative (PID) control with Bayesian optimization in order to determine an optimal linear state-feedback controller for tracking a metric.

According to an aspect of the present disclosure, a method for performing a dynamic request for quotation (RFQ) pricing operation is provided. The method is implemented by at least one processor. The method includes: receiving, by the at least one processor, first information that relates to a bid price for a first instrument and second information that relates to an ask price for the first instrument; selecting a metric to be used in conjunction with a determination of an RFQ price with respect to the first instrument; estimating an output of a proportional-integral-derivative (PID) controller based on a predetermined function of the metric; adjusting a result of the estimating by using a Bayesian optimization process; and using the PID controller, the adjusted result, the first information, and the second information to determine the RFQ price.

The metric may include at least one from among a hit ratio, a performance ratio, an expected profit, an expected market share, and a risk level.

The Bayesian optimization process may be designed to minimize a tracking error that corresponds to a difference between an observed value of the metric and a target value of the metric.

The predetermined function of the metric may include a proportional term that controls a response of the PID controller to an instantaneous value of the tracking error, an integral term that controls the response of the PID controller to an accumulation of the tracking error over a predetermined time interval, and a derivative term that controls the response of the PID controller to a rate of change of the tracking error.

The Bayesian optimization process may be performed within a Monte-Carlo simulation of the RFQ pricing operation.

The Bayesian optimization process may include applying a predetermined iterative algorithm to generate a solution to a predetermined Gaussian Process regression problem.

The Monte-Carlo simulation may implement an ability to tune and evaluate the PID controller for robustness against prediction error by introducing random noise in outputs of the PID controller based on samples from a predetermined Gaussian noise function.

The Monte-Carlo simulation may implement an ability to tune and evaluate the PID controller for constraints in an actuation of the PID controller by introducing an upper bound and a lower bound to a range of outputs of the PID controller.

The first instrument may include at least one from among a stock that relates to a first entity, a bond that relates to the first entity, an option that relates to the first entity, and a derivative financial instrument that relates to the first entity.

According to another exemplary embodiment, a computing apparatus for performing a dynamic request for quotation (RFQ) pricing operation is provided. The computing apparatus includes a processor; a memory; and a communication interface coupled to each of the processor and the memory. The processor is configured to: receive, via the communication interface, first information that relates to a bid price for a first instrument and second information that relates to an ask price for the first instrument; select a metric to be used in conjunction with a determination of an RFQ price with respect to the first instrument; estimate an output of a proportional-integral-derivative (PID) controller based on a predetermined function of the metric; adjust a result of the estimation by using a Bayesian optimization process; and use the PID controller, the adjusted result, the first information, and the second information to determine the RFQ price.

The metric may include at least one from among a hit ratio, a performance ratio, an expected profit, an expected market share, and a risk level.

The Bayesian optimization process may be designed to minimize a tracking error that corresponds to a difference between an observed value of the metric and a target value of the metric.

The predetermined function of the metric may include a proportional term that controls a response of the PID controller to an instantaneous value of the tracking error, an integral term that controls the response of the PID controller to an accumulation of the tracking error over a predetermined time interval, and a derivative term that controls the response of the PID controller to a rate of change of the tracking error.

The Bayesian optimization process may be performed within a Monte-Carlo simulation of the RFQ pricing operation.

The Bayesian optimization process may include applying a predetermined iterative algorithm to generate a solution to a predetermined Gaussian Process regression problem.

The Monte-Carlo simulation may implement an ability to tune and evaluate the PID controller for robustness against prediction error by introducing random noise in outputs of the PID controller based on samples from a predetermined Gaussian noise function.

The Monte-Carlo simulation may implement an ability to tune and evaluate the PID controller for constraints in an actuation of the PID controller by introducing an upper bound and a lower bound to a range of outputs of the PID controller.

The first instrument may include at least one from among a stock that relates to a first entity, a bond that relates to the first entity, an option that relates to the first entity, and a derivative financial instrument that relates to the first entity.

According to yet another exemplary embodiment, a non-transitory computer readable storage medium storing instructions for performing a dynamic request for quotation (RFQ) pricing operation is provided. The storage medium includes executable code which, when executed by a processor, causes the processor to: receive first information that relates to a bid price for a first instrument and second information that relates to an ask price for the first instrument; select a metric to be used in conjunction with a determination of an RFQ price with respect to the first instrument; estimate an output of a proportional-integral-derivative (PID) controller based on a predetermined function of the metric; adjust a result of the estimation by using a Bayesian optimization process; and use the PID controller, the adjusted result, the first information, and the second information to determine the RFQ price.

The metric may include at least one from among a hit ratio, a performance ratio, an expected profit, an expected market share, and a risk level.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 4 is a flowchart of an exemplary process for implementing a method for dynamic RFQ pricing using PID control with Bayesian optimization in order to determine an optimal linear state-feedback controller for tracking a metric.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
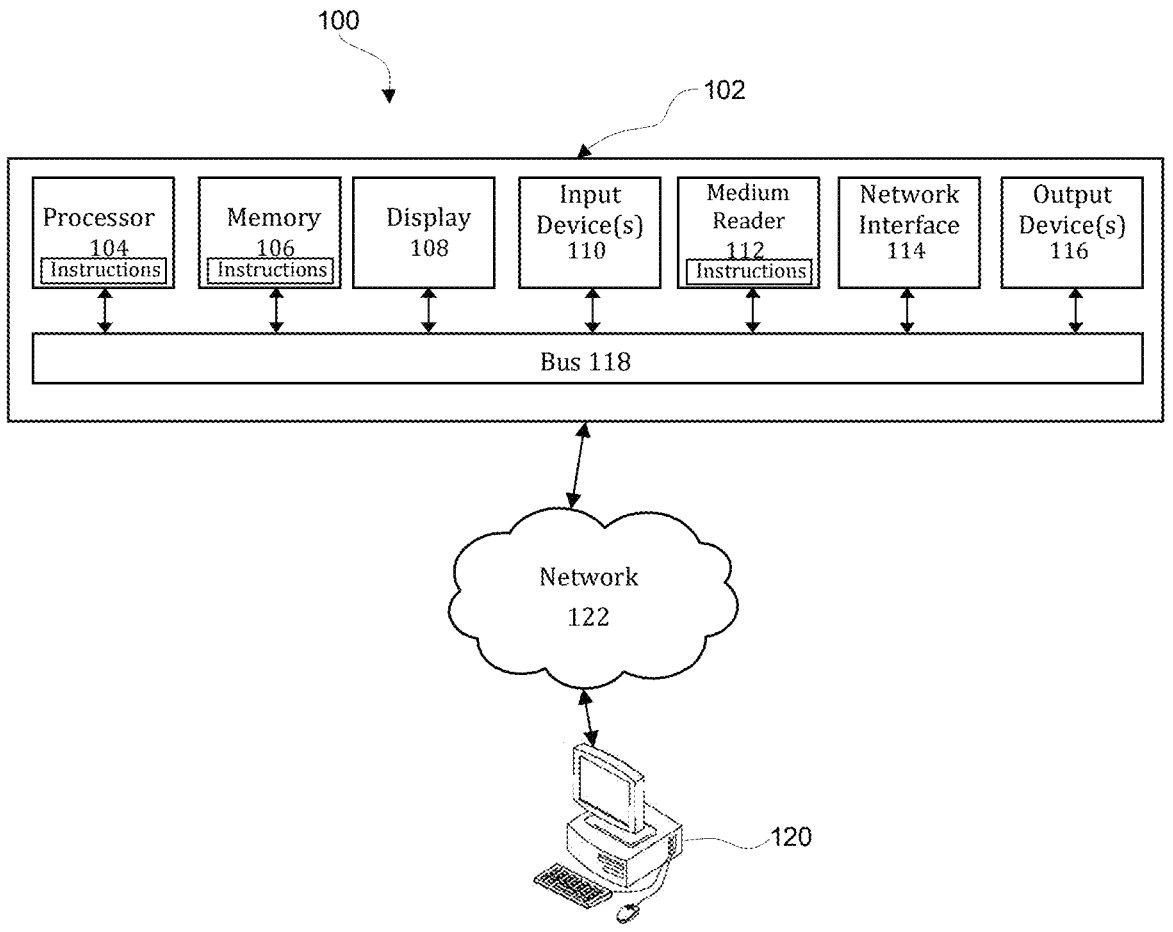
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for dynamic request for quotation (RFQ) pricing using proportional-integral-derivative (PID) control with Bayesian optimization in order to determine an optimal linear state-feedback controller for tracking a metric.

Figure 2:
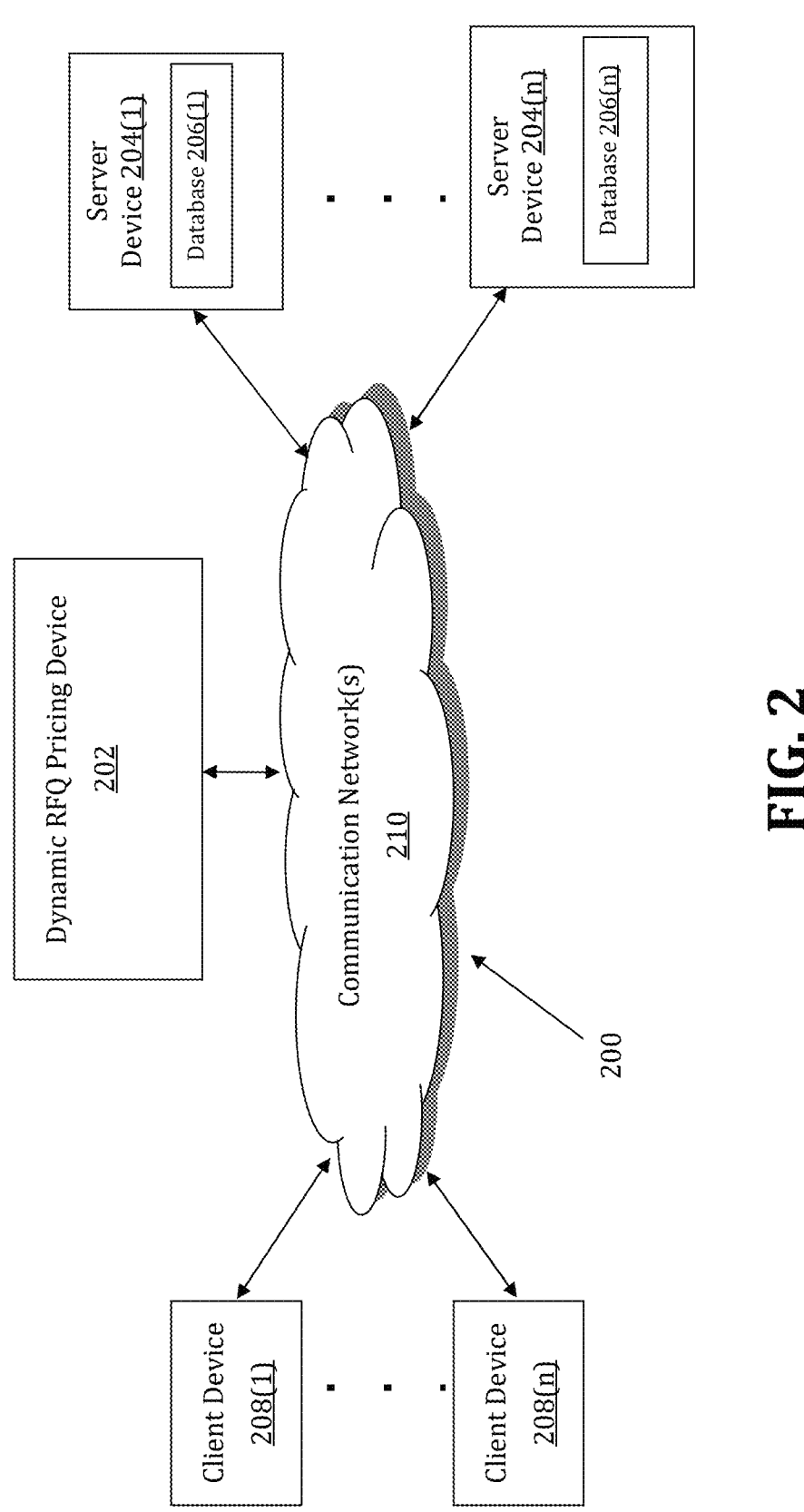
FIG. 2 illustrates an exemplary diagram of a network environment.

Referring to FIG. 2, a schematic of an exemplary network environment 200 for implementing a method for dynamic RFQ pricing using PID control with Bayesian optimization in order to determine an optimal linear state-feedback controller for tracking a metric is illustrated. In an exemplary embodiment, the method is executable on any networked computer platform, such as, for example, a personal computer (PC).

The method for dynamic RFQ pricing using PID control with Bayesian optimization in order to determine an optimal linear state-feedback controller for tracking a metric may be implemented by a Dynamic Request For Quotation Pricing (DRFQP) device 202. The DRFQP device 202 may be the same or similar to the computer system 102 as described with respect to FIG. 1. The DRFQP device 202 may store one or more applications that can include executable instructions that, when executed by the DRFQP device 202, cause the DRFQP device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DRFQP device 202 itself, may be located in virtual server(s) running in a cloud-based computing environment rather than being tied to one or more specific physical network computing devices. Also, the application(s) may be running in one or more virtual machines (VMs) executing on the DRFQP device 202. Additionally, in one or more embodiments of this technology, virtual machine(s) running on the DRFQP device 202 may be managed or supervised by a hypervisor.

In the network environment 200 of FIG. 2, the DRFQP device 202 is coupled to a plurality of server devices 204(1)-204(n) that hosts a plurality of databases 206(1)-206(n), and also to a plurality of client devices 208(1)-208(n) via communication network(s) 210. A communication interface of the DRFQP device 202, such as the network interface 114 of the computer system 102 of FIG. 1, operatively couples and communicates between the DRFQP device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DRFQP device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and DRFQP devices that efficiently implement a method for dynamic RFQ pricing using PID control with Bayesian optimization in order to determine an optimal linear state-feedback controller for tracking a metric.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DRFQP device 202 may be a standalone device or integrated with one or more other devices or apparatuses, such as one or more of the server devices 204(1)-204(n), for example. In one particular example, the DRFQP device 202 may include or be hosted by one of the server devices 204(1)-204(n), and other arrangements are also possible. Moreover, one or more of the devices of the DRFQP device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204 (n) may include, among other features, one or more processors, a memory, and a communication interface, which are coupled together by a bus or other communication link, although other numbers and/or types of network devices may be used. The server devices 204(1)-204(n) in this example may process requests received from the DRFQP device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206 (n) that are configured to store historical RFQ pricing data and data that relates to tracking metrics for optimizing RFQ pricing.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204 (1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208 (1)-208(n) in this example may include any type of computing device that can interact with the DRFQP device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the DRFQP device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the DRFQP device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DRFQP device 202, the server devices 204(1)-204(n), or the client devices 208(1)-208(n), for example, may be configured to operate as virtual instances on the same physical machine. In other words, one or more of the DRFQP device 202, the server devices 204(1)-204(n), or the client devices 208(1)-208(n) may operate on the same physical device rather than as separate devices communicating through communication network(s) 210. Additionally, there may be more or fewer DRFQP devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
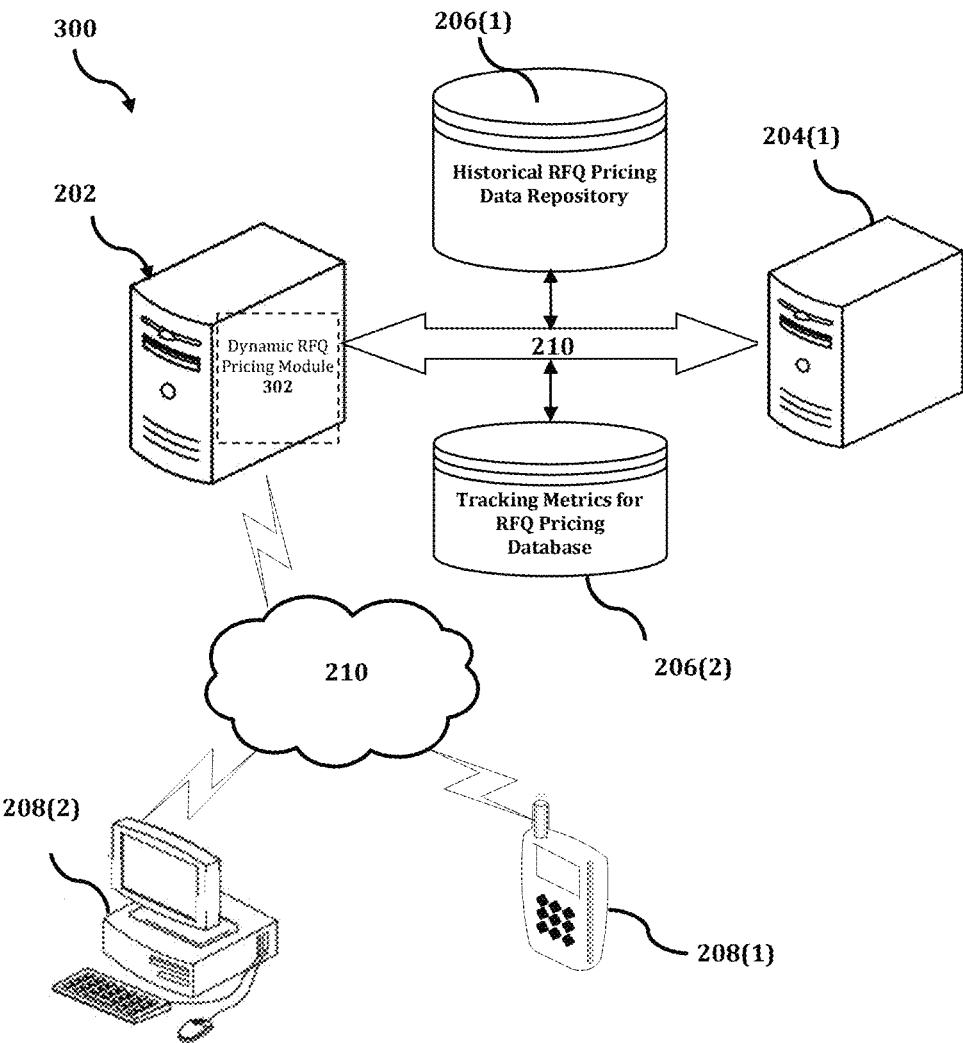
FIG. 3 shows an exemplary system for implementing a method for dynamic RFQ pricing using PID control with Bayesian optimization in order to determine an optimal linear state-feedback controller for tracking a metric.

The DRFQP device 202 is described and illustrated in FIG. 3 as including a dynamic request for quotation (RFQ) pricing module 302, although it may include other rules, policies, modules, databases, or applications, for example. As will be described below, the dynamic RFQ pricing module 302 is configured to implement a method for dynamic RFQ pricing using PID control with Bayesian optimization in order to determine an optimal linear state-feedback controller for tracking a metric.

An exemplary process 300 for implementing a mechanism for dynamic RFQ pricing using PID control with Bayesian optimization in order to determine an optimal linear state-feedback controller for tracking a metric by utilizing the network environment of FIG. 2 is illustrated as being executed in FIG. 3. Specifically, a first client device 208(1) and a second client device 208(2) are illustrated as being in communication with DRFQP device 202. In this regard, the first client device 208(1) and the second client device 208(2) may be "clients" of the DRFQP device 202 and are described herein as such. Nevertheless, it is to be known and understood that the first client device 208(1) and/or the second client device 208(2) need not necessarily be "clients" of the DRFQP device 202, or any entity described in association therewith herein. Any additional or alternative relationship may exist between either or both of the first client device 208(1) and the second client device 208(2) and the DRFQP device 202, or no relationship may exist.

Further, DRFQP device 202 is illustrated as being able to access a historical RFQ pricing data repository 206(1) and a tracking metrics for RFQ pricing database 206(2). The dynamic RFQ pricing module 302 may be configured to access these databases for implementing a method for dynamic RFQ pricing using PID control with Bayesian optimization in order to determine an optimal linear state-feedback controller for tracking a metric.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the DRFQP device 202 via broadband or cellular communication. Of course, these embodiments are merely exemplary and are not limiting or exhaustive.

Upon being started, the dynamic RFQ pricing module 302 executes a process for dynamic RFQ pricing using PID control with Bayesian optimization in order to determine an optimal linear state-feedback controller for tracking a metric. An exemplary process for dynamic RFQ pricing using PID control with Bayesian optimization in order to determine an optimal linear state-feedback controller for tracking a metric is generally indicated at flowchart 400 in FIG. 4.

In process 400 of FIG. 4, at step S402, the dynamic RFQ pricing module 302 receives first information that relates to a bid price for a financial instrument and second information that relates to an ask price for the financial instrument. In an exemplary embodiment, the financial instrument may include any one or more of a stock that relates to an entity, such as a corporation or other type of commercial concern; a bond that relates to the entity; an option that relates to the entity; and/or a derivative financial instrument that relates to the entity.

At step S404, the dynamic RFQ pricing module 302 selects a metric to be used in conjunction with a determination of an RFQ price with respect to the financial instrument. In an exemplary embodiment, the metric may include any one or more of a hit ratio, a performance ratio, an expected profit, an expected market share, a risk level, and/or any other suitable type of metric.

At step S406, the dynamic RFQ pricing module 302 estimates an output of a proportional-integral-derivative (PID) controller based on a predetermined function of the metric. In an exemplary embodiment, the predetermined function of the metric is a function of a tracking error that corresponds to a difference between an observed value of the metric and a target value of the metric. Also, the predetermined function may be expressed as a sum of three separate terms: a proportional term that controls a response of the PID controller to an instantaneous value of the tracking error; an integral term that controls the response of the PID controller to an accumulation of the tracking error over a predetermined time interval; and a derivative term that controls the response of the PID controller to a rate of change of the tracking error. A further and more detailed description of the predetermined function is provided below.

At step S408, the dynamic RFQ pricing module 302 adjusts the estimate resulting from the operation performed in step S406 by using a Bayesian optimization process that is designed to minimize the tracking error. In an exemplary embodiment, the Bayesian optimization process includes applying a predetermined iterative algorithm in order to generate a solution to a predetermined Gaussian Process regression problem, as described in further detail below. In an exemplary embodiment, the Bayesian optimization process is not performed every time that the PID controller is queried to produce a control output, but is instead performed from time to time depending on a variety of factors, such as any factor that affects the behavior of the market as a dynamic system, e.g., news, market regimes, pricing trends, changes in competitors or liquidity, etc.

In an exemplary embodiment, the Bayesian optimization process is performed within a Monte-Carlo simulation of the dynamic RFQ pricing operation. In an exemplary embodiment, the Monte-Carlo simulation implements an ability to tune and evaluate the PID controller for robustness against prediction error by introducing random noise in outputs of the PID controller based on samples from a predetermined Gaussian noise function. In addition, the Monte-Carlo simulation may also implement an ability to tune and evaluate the PID controller for constraints in an actuation of the PID controller by introducing an upper bound and a lower bound to a range of outputs of the PID controller.

At step S410, the dynamic RFQ pricing module 302 uses each of the PID controller, the adjusted estimate of the output of the PID controller, the first information that relates to the bid price of the financial instrument, and the second information that relates to the ask price of the financial instrument to determine an RFQ price. In an exemplary embodiment, the as-determined RFQ price is optimized with respect to the tracking error of the selected metric as a result of the Bayesian optimization process that is performed in order to determine the adjustment to the estimate of the output of the PID controller.

The present inventive concept arises within the domain of quantitative research that is performed in order to develop quantitative tools and models to assist traders in financial markets. Determining pricing for RFQs in an automated and systematic way allows traders to respond to RFQs more efficiently and consistently in a way that aligns with the goals of the traders, as specified by the value of the metric that the traders would like to track.

There are several challenges when devising a RFQ pricing system that effectively tracks the value of a metric with low tracking error. A first challenge relates to robustness to a bias and a variance of a prediction model. The prediction model aims to predict the effect of quoting a price for an RFQ. Inevitably, there will be some bias and variance in such predictions. Designing a controller that is robust with respect to prediction model bias and variance is a challenge for the practical use of the system.

A second challenge relates to determining optimal parameters for the controller. In an exemplary embodiment, once a control architecture has been devised, the parameters that determine the behavior of the controller must be tuned for optimality against the objective of the controller.

A third challenge relates to incorporation of constraints to the controller. In an exemplary embodiment, the system must enable the optimization of the controller in situations when the control outputs are constrained within a given region or in a given direction.

Research question: In an exemplary embodiment, the broad research question to be addressed by the present inventive concept is: Given a prediction model that can predict what the quote price corresponding to a metric is, and a target value for that metric, how can a controller be devised to minimize the tracking error with respect to the metric when combined with a prediction model for RFQ pricing?

In an exemplary embodiment, the two solutions proposed include: 1) Proportional-Integral-Derivative (PID) Control with Bayesian Optimization to determine the optimal linear state-feedback controller for tracking a given metric; and 2) Reinforcement Learning (RL) with optional Symbolic Regression to determine a pseudo-optimal nonlinear state-feedback controller for tracking a given metric.

Both approaches assume availability of a prediction model to ultimately produce RFQ pricing. Both approaches can be optimized for robustness under bias and variance of prediction model, as well as optimization under constraints on the output of the controller.

Figure 5:
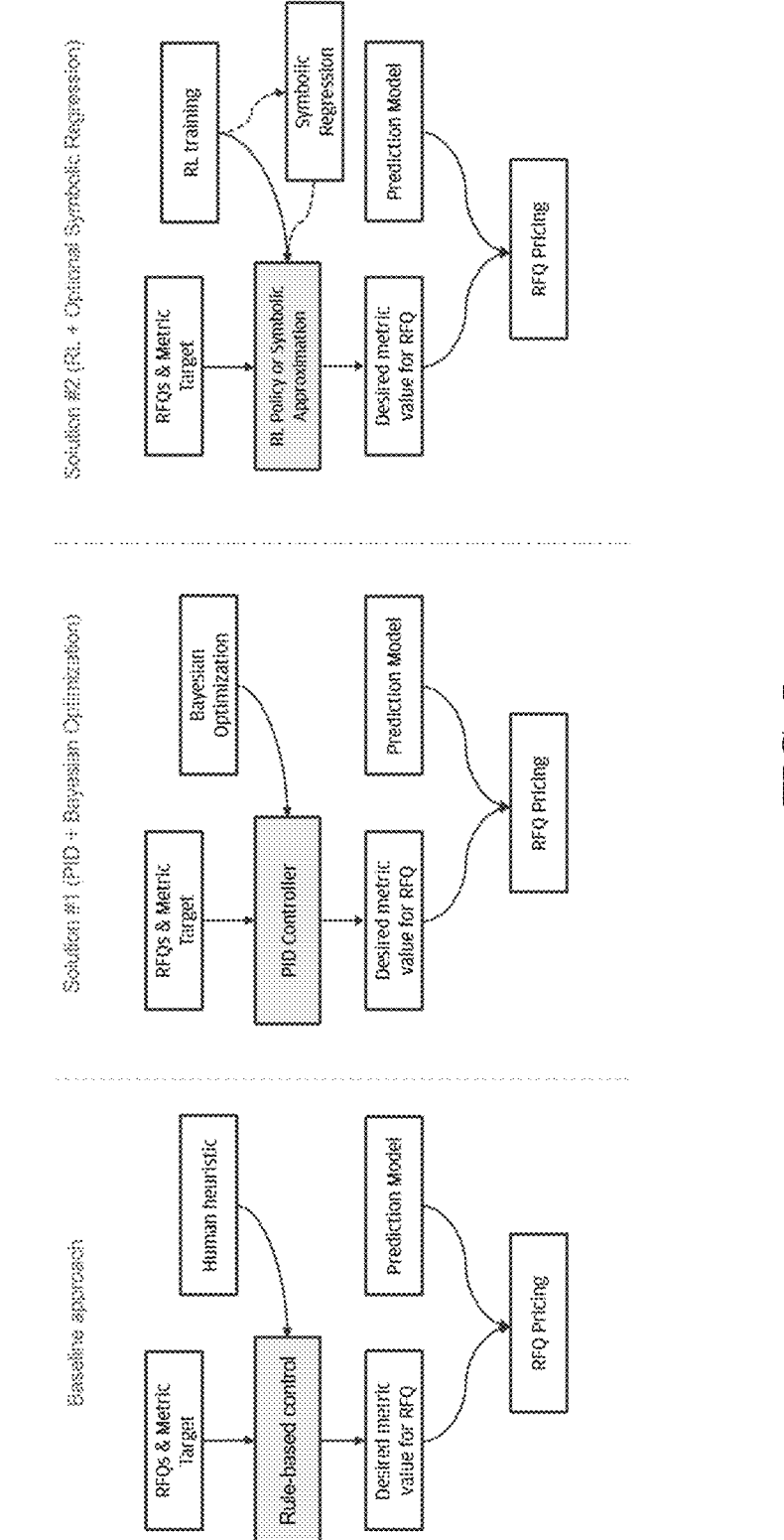
FIG. 5 is a diagram that illustrates a comparison between a baseline approach and two proposed methods for dynamic RFQ pricing, according to an exemplary embodiment.

FIG. 5 is a diagram 500 that illustrates a comparison between a baseline approach and two proposed methods for dynamic RFQ pricing, according to an exemplary embodiment. A descriptive diagram of the systems proposed, compared against a baseline approach which uses a rule-based controller determined by human subject matter expertise, is illustrated in FIG. 5.

In an exemplary embodiment, the main techniques used to solve the problem of obtaining a controller suitable for the RFQ pricing problem include classical control theory tools such as PID control, as well as machine learning tools such as Bayesian Optimization, Reinforcement Learning, and multi-objective evolutionary algorithms for Symbolic Regression.

Solution 1—PID Control with Bayesian Optimization: The PID controller is determined by the control law as follows:

$$u(t) = K_p e(t) + K_i \int e(t)\,dt + K_d \frac{de}{dt}$$

In the control law as expressed above, the output of the controller at time t is u(t), the tracking error is e(t) and is defined as the difference between the measured value and the target value of the metric at time t, and the parameters determining the behavior of the controller are $K_p$, $K_i$, $K_d$. It is noted that these parameters may also be referred to as gains, and that they respectively correspond to the proportional, integral, and derivative gains. For RFQ pricing, the final output of the controller at any time is equal to u(t)+$P_{target}$, where $P_{target}$ is the target value of the metric being tracked, and the error e(t)=$P_{observed}$−$P_{target}$, where $P_{observed}$ is the observed value of the metric being tracked. This is a linear controller because the input to the controller is the error $P_{observed}$−$P_{target}$, which means the controller is agnostic to the actual magnitude of $P_{observed}$ or $P_{target}$ as it operates on the difference between the two, providing the same behavior for different values of $P_{observed}$ and $P_{target}$ which yield the same error $P_{observed}$−$P_{target}$.

In an exemplary embodiment, the proportional term controls the response of the controller to the instantaneous tracking error, yielding higher control outputs as corrections to higher instantaneous tracking errors. The integral term controls the response of the controller to the accumulated tracking error over past time, yielding higher control outputs if there is a persistent tracking error over time. The derivative term controls the response of the controller to the rate of change of the tracking error, yielding higher control output if the rate of change of the tracking error increases.

In an exemplary embodiment, the optimal gains of the PID controller can be obtained using Bayesian Optimization within a Monte-Carlo simulation, where the objective is to determine the value of the proportional, integral, and derivative gains which yield minimum tracking error within the Monte-Carlo simulations. Bayesian Optimization allows for global optimization of a black-box system without any assumptions on its functional form, and is thus suitable for optimizing the performance of the controller as evaluated in the Monte-Carlo simulation. Formally, the goal is to find the location x∈ $\mathbb{R}^n$ corresponding to the global minimum of a function $f: \mathbb{R}^n \to \mathbb{R}$. In an exemplary embodiment, the function $f$ represents a measure of the performance of the controller as a function of controller gains. In an exemplary embodiment, and without loss of generality, the function being evaluated is the standard error of the tracking error of the controller against the target value of the metric across the Monte-Carlo samples at a given timestep, integrated over a period of time.

The methodology used for Bayesian Optimization includes modeling the function determining the performance of the controller in the Monte-Carlo simulation for different values of controller parameters, i.e., control gains, using a Gaussian Process (GP). GPs are formally defined as stochastic processes where any finite subcollection of random variables has a multivariate Gaussian distribution. Using a mean function m(•) and covariance function, k(•,•), a GP is denoted as h(•)~ $\mathcal{GP}$(m(•), k(•,•)). The Bayesian Optimization problem then becomes a GP regression problem, which can be solved using the following iterative algorithm:
Bayesian Optimization using GP Regression.
For t=1, 2, . . . , T repeat:
  1) Find the next sampling point $x_t$ by optimizing the acquisition function over the $$GP: x_t = \arg\max_x u(x|D_{1:t-1})$$

2) Obtain a possibly noisy sample $y_t=f(x_t)+\epsilon_t$ from the objective function $f$
  3) Add the sample to previous samples $\mathcal{D}_{1:t}=\{\mathcal{D}_{1:t-1}, (x_t, y_t)\}$ and update the GP In an exemplary embodiment, executing this algorithm with the Monte-Carlo simulation being executed to evaluate the value of $f$, i.e., the performance of the controller, for different values of x, i.e. the PID controller gains, at each iteration, yields the controller parameters that globally minimize the tracking error of the controller used for RFQ pricing.

In an exemplary embodiment, using Bayesian Optimization to tune the gains of the PID controller yields the optimal linear controller for the RFQ pricing problem.

In an exemplary embodiment, the role of the Monte-Carlo simulation is to provide a simulation environment for tuning and testing the performance of the controller, where RFQs are received over time and they are executed according to a stochastic process. Importantly, the Monte-Carlo simulation can be used to evaluate the performance of the controller with two considerations.

The first consideration relates to tuning and evaluating for robustness against prediction error in the prediction model, for example by introducing random noise in the control outputs of the controller sampled from a Gaussian $\mathcal{N}(\mu_e, \sigma_e^2)$ which represents the error introduced by imperfect prediction model. This is valuable for the practical use of the system as prediction model errors are commonplace for RFQ pricing and it is desirable for the controller to be robust against this.

The second consideration relates to tuning and evaluating for constraints in the actuation of the controller, for example, by setting upper and/or lower bounds to the range of controller outputs. Consequently, the tuning process can determine the optimal gains accounting for the controller constraints. This is valuable for the practical use of the system the capability to add constraints in the direction and range of pricing expands the utility of the system for automated RFQ pricing for a more diverse set of market scenarios and strategic needs for the market-maker.

Solution 2—Reinforcement Learning (RL) with Optional Symbolic Regression: In an exemplary embodiment, the controller, also referred to herein as policy in the context of RL terminology, is determined by a neural network $\pi_\theta$ parametrized by parameters $\theta$, which is tuned using Reinforcement Learning. Optionally, a symbolic approximation $\hat{\pi} \approx \pi_\theta$ may be obtained via symbolic regression, using a multi-objective evolutionary algorithm. This optional approximation may be valuable in cases when a simple algebraic expression is preferred over a neural network as a controller for RFQ pricing.

The Reinforcement Learning controller is obtained by formulating a Markov Decision Process (MDP) which represents the decision-making process the RFQ pricing controller aims to solve, i.e., determining the control outputs which minimize the tracking error of the controller to a given RFQ target metric. An MDP consists of a tuple $(\mathcal{S}, \mathcal{A}, \mathcal{T}, \mathcal{R}, \gamma)$ where $\mathcal{S}$ is the set of states called the state space, $\mathcal{A}$ is the set of actions called the action space, $\mathcal{T}$ is the transition dynamics of the process determining the evolution in states of the process as actions are taken, $\mathcal{R}$ is the reward function representing the immediate reward obtained upon state transitions, and $\gamma$ is a scalar discount factor which discounts the value of future rewards. In an exemplary embodiment, a possible MDP that can be formulated for the RFQ pricing problem includes the following: 1) The state space includes [realized value of metric at current time, target value of the metric]. 2) The action space is the desired deviation from the target value of the metric at a given time, i.e., equivalent to the way the PID controller output is used. In this regard, the action of the controller is a and the value used for RFQ pricing is $a + P_{target}$. The actions are sampled as $a \sim \pi_\theta(s)$ where s is the state at a given time. 3) The transition dynamics are given by the Monte-Carlo simulation, capturing stochastic dynamics across multiple samples. 4) The reward function is a function that provides increased value of rewards for lower tracking errors, i.e., the negative of a cost function of the performance of the controller. In an exemplary embodiment, the reward function is a Radial Basis Function on the tracking error of the controller against the desired value of the metric, given by $\varphi(e(t)) = \varphi(P_{observed} - P_{target})$, where without loss of generality, $\varphi(\bullet)$ can be a Gaussian Radial Basis Function given by $\varphi(e) = \exp(-\varepsilon^* e)$ for shape coefficient $\varepsilon$. The role of the reward function is to provide larger values of reward for lower values of error e.

Using the above action space, the controller obtained is a nonlinear controller, because the input to the controller is not the error $P_{observed} - P_{target}$, but rather the values of $P_{observed}$ and $P_{target}$ separately, which means the controller can adjust its behavior depending on the magnitude of $P_{observed}$ and $P_{target}$. It is noted that this represents a difference with the PID controller, which is a linear controller.

In an exemplary embodiment, the RL algorithm Proximal Policy Optimization (PPO) is used to tune the behavior of the RL controller or policy. The PPO objective includes policy parameter updates via the following:

$$\theta_{k+1} = \arg\max_\theta \ \mathbb{E}_{s,a \sim \pi_{\theta_k}} [L(s, a, \theta_k, \theta)]$$

where L is a clipped objective given by:

$$L(s, a, \theta_k, \theta) = \min\left( \frac{\pi_\theta(a|s)}{\pi_{\theta_k}(a|s)} A^{\pi_{\theta_k}}(s, a), g\left(\epsilon, A^{\pi_{\theta_k}}(s, a)\right) \right)$$

$$g\left(\epsilon, A^{\pi_{\theta_k}}(s, a)\right) = \begin{cases} (1+\epsilon)A & A \ge 0 \\ (1-\epsilon)A & A < 0 \end{cases}$$

and where A corresponds to the advantage value as defined in RL, which can be the simple value baseline advantage or alternatives such as those provided by Generalized Advantage Estimation (GAE).

Using PPO, there are no general theoretical guarantees of global optimality for the learned policy. Therefore, with this approach, a pseudo-optimal nonlinear controller for the RFQ pricing problem is obtained.

The capability of the RL controller to respond to past information is determined by the choice of architecture for the policy network $\pi_\theta$. If the architecture is a feedforward network, the policy will only be able to use present information to determine its control outputs. If the architecture is a recurrent network, the policy will be able to incorporate past information to determine its control output due to the presence of a hidden state. Alternatively, the use of past information can be incorporated by a different choice of state space definition for the MDP, where the state includes a concatenation of values of $P_{observed}$ and $P_{target}$ for past times.

In an exemplary embodiment, the MDP uses the Monte-Carlo simulation as dynamics of the MDP to solve the control problem. The role of the Monte-Carlo simulation is to provide a simulation environment for tuning and testing the performance of the controller, where RFQs are received over time and they are executed according to a stochastic process. Importantly, the Monte-Carlo simulation can be used to evaluate the performance of the controller with two considerations.

The first consideration relates to tuning and evaluating for robustness against prediction error in the prediction model, for example by introducing random noise in the control outputs of the controller sampled from a Gaussian $\mathcal{N}(\mu_e, \sigma_e^2)$ which represents the error introduced by imperfect prediction model. This is valuable for the practical use of the system as prediction model errors are commonplace for RFQ pricing and it is desirable for the controller to be robust against this.

The second consideration relates to tuning and evaluating for constraints in the actuation of the controller, such as, for example, by setting upper and or lower bounds to the range of controller outputs. Consequently, the tuning process can determine the optimal gains accounting for the controller constraints. This is valuable for the practical use of the system the capability to add constraints in the direction and range of pricing expands the utility of the system for automated RFQ pricing for a more diverse set of market scenarios and strategic needs for the market-maker.

Optionally, Symbolic Regression may be used as a means to perform symbolic distillation of the neural network policy obtained via Reinforcement Learning, yielding a symbolic approximation $\hat{\pi}\sim\pi_\theta$. The methodology to obtain the symbolic approximation $\hat{\pi}$ is to use a multi-objective evolutionary algorithm that performs search over a space of symbolic expressions.

In order to perform symbolic regression, input-output pairs are required for the regression problem. In an exemplary embodiment, a dataset D of $\{(s, a)_i\}_{\forall i \in D}$ is generated by querying the policy $a\sim\pi_\theta(s)$ for values of s within the state space, e.g., uniformly distributed values or according the probability distribution seen for different states during Monte-Carlo simulations.

In an exemplary embodiment, the search space is defined by the combinations of: 1) binary operators such as $\{+, -, \times, \div, \ldots\}$; and 2) unary operators such as $\{\sin(\bullet), \sqrt{\bullet}, \ldots\}$. The multi-objective optimization consists of two objectives: 1) minimizing approximation error; and 2) minimizing complexity of the symbolic expression.

A composite score can be determined based on trade-off and constraints on approximation error and complexity, as suitable for the specific use case. In an exemplary embodiment, a genetic algorithm is used to optimize the composite score by mutating expressions within a population of candidate expressions, and the search is iterated for a finite number of steps until the best performing individual within the population is returned, yielding the symbolic approximation $\hat{\pi}t\sim\pi_\theta$.

Accordingly, with this technology, an optimized process for dynamic request for quotation pricing using PID control with Bayesian optimization in order to determine an optimal linear state-feedback controller for tracking a metric is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for performing a dynamic request for quotation (RFQ) pricing operation, the method being implemented by at least one processor, the method comprising:

receiving, from a first device and by the at least one processor via a network, first information that relates to a bid price for a first instrument;

receiving, from a second device different from the first device and by the at least one processor via the network, second information that relates to an ask price for the first instrument;

selecting a metric to be used in conjunction with a determination of an RFQ price with respect to the first instrument;

estimating an output of a proportional-integral-derivative (PID) controller based on a predetermined function of the metric;

determining, by the PID controller, whether a Bayesian optimization process is to be applied to a result of the estimating based on presence of a factor that affects behavior of a dynamic system associated with the first instrument, wherein the Bayesian optimization process is not performed every time that the PID controller is queried but only based on the presence of the factor;

when the factor is determined to be present, selectively applying the Bayesian optimization process to adjust a result of the estimating, wherein the selectively applying of the Bayesian optimization process includes accessing historical data repository via the network, separately accessing tracking metrics database via the network and executing of an iterative algorithm; and using the PID controller, the adjusted result, the first information, and the second information to determine the RFQ price, wherein the Bayesian optimization process is performed within a Monte-Carlo simulation of the RFQ pricing operation, and wherein the Monte-Carlo simulation implements an ability to tune and evaluate the PID controller for robustness against prediction error by introducing random noise in outputs of the PID controller based on samples from a predetermined Gaussian noise function.

2. The method of claim 1, wherein the metric includes at least one from among a hit ratio, a performance ratio, an expected profit, an expected market share, and a risk level.

3. The method of claim 1, wherein the Bayesian optimization process is designed to minimize a tracking error that corresponds to a difference between an observed value of the metric and a target value of the metric.

4. The method of claim 3, wherein the predetermined function of the metric includes a proportional term that controls a response of the PID controller to an instantaneous value of the tracking error, an integral term that controls the response of the PID controller to an accumulation of the tracking error over a predetermined time interval, and a derivative term that controls the response of the PID controller to a rate of change of the tracking error.

5. The method of claim 1, wherein the Bayesian optimization process generates a solution to a predetermined Gaussian Process regression problem.

6. The method of claim 1, wherein the Monte-Carlo simulation implements an ability to tune and evaluate the PID controller for constraints in an actuation of the PID controller by introducing an upper bound and a lower bound to a range of outputs of the PID controller.

7. The method of claim 1, wherein the first instrument includes at least one from among a stock that relates to a first entity, a bond that relates to the first entity, an option that relates to the first entity, and a derivative financial instrument that relates to the first entity.

8. A computing apparatus for performing a dynamic request for quotation (RFQ) pricing operation, the computing apparatus comprising:

a processor;

a memory; and a communication interface coupled to each of the processor and the memory, wherein the processor is configured to:

receive, over a network and from a first device via the communication interface, first information that relates to a bid price for a first instrument;

receive, over the network and from a second device different from the first device via the communication interface, second information that relates to an ask price for the first instrument;

select a metric to be used in conjunction with a determination of an RFQ price with respect to the first instrument;

estimate an output of a proportional-integral-derivative (PID) controller based on a predetermined function of the metric;

determine, via the PID controller, whether a Bayesian optimization process is to be applied to a result of the estimating based on presence of a factor that affects behavior of a dynamic system associated with the first instrument, wherein the Bayesian optimization process is not performed every time that the PID controller is queried but only based on the presence of the factor;

when the factor is determined to be present, selectively applying the Bayesian optimization process to adjust a result of the estimation, wherein the selectively applying of the Bayesian optimization process includes accessing historical data repository via the network, separately accessing tracking metrics database via the network and executing of an iterative algorithm; and use the PID controller, the adjusted result, the first information, and the second information to determine the RFQ price, wherein the Bayesian optimization process is performed within a Monte-Carlo simulation of the RFQ pricing operation, and wherein the Monte-Carlo simulation implements an ability to tune and evaluate the PID controller for robustness against prediction error by introducing random noise in outputs of the PID controller based on samples from a predetermined Gaussian noise function.

9. The computing apparatus of claim 8, wherein the metric includes at least one from among a hit ratio, a performance ratio, an expected profit, an expected market share, and a risk level.

10. The computing apparatus of claim 8, wherein the Bayesian optimization process is designed to minimize a tracking error that corresponds to a difference between an observed value of the metric and a target value of the metric.

11. The computing apparatus of claim 10, wherein the predetermined function of the metric includes a proportional term that controls a response of the PID controller to an instantaneous value of the tracking error, an integral term that controls the response of the PID controller to an accumulation of the tracking error over a predetermined time interval, and a derivative term that controls the response of the PID controller to a rate of change of the tracking error.

12. The computing apparatus of claim 8, wherein the Bayesian optimization process generates a solution to a predetermined Gaussian Process regression problem.

13. The computing apparatus of claim 8, wherein the Monte-Carlo simulation implements an ability to tune and evaluate the PID controller for constraints in an actuation of the PID controller by introducing an upper bound and a lower bound to a range of outputs of the PID controller.

14. The computing apparatus of claim 8, wherein the first instrument includes at least one from among a stock that relates to a first entity, a bond that relates to the first entity, an option that relates to the first entity, and a derivative financial instrument that relates to the first entity.

15. A non-transitory computer readable storage medium storing instructions for performing a dynamic request for quotation (RFQ) pricing operation, the storage medium comprising executable code which, when executed by a processor, causes the processor to:

receive, from a first device and via a network, first information that relates to a bid price for a first instrument;

receive, from a second device and via the network, second information that relates to an ask price for the first instrument;

select a metric to be used in conjunction with a determination of an RFQ price with respect to the first instrument;

estimate an output of a proportional-integral-derivative (PID) controller based on a predetermined function of the metric;

determine, via the PID controller, whether a Bayesian optimization process is to be applied to a result of the estimating based on presence of a factor that affects behavior of a dynamic system associated with the first instrument, wherein the Bayesian optimization process is not performed every time that the PID controller is queried but only based on the presence of the factor;

when the factor is determined to be present, selectively applying the Bayesian optimization process to adjust a result of the estimation, wherein the selectively applying of the Bayesian optimization process includes accessing historical data repository via the network, separately accessing tracking metrics database via the network and executing of an iterative algorithm; and use the PID controller, the adjusted result, the first information, and the second information to determine the RFQ price, wherein the Bayesian optimization process is performed within a Monte-Carlo simulation of the RFQ pricing operation, and wherein the Monte-Carlo simulation implements an ability to tune and evaluate the PID controller for robustness against prediction error by introducing random noise in outputs of the PID controller based on samples from a predetermined Gaussian noise function.

16. The non-transitory computer readable storage medium of claim 15, wherein the metric includes at least one from among a hit ratio, a performance ratio, an expected profit, an expected market share, and a risk level.

* * * * *